United States Patent
Taniuchi et al.

(10) Patent No.: US 8,048,193 B2
(45) Date of Patent: Nov. 1, 2011

(54) METHOD FOR PRODUCING GOLD COLLOID AND GOLD COLLOID

(75) Inventors: Junichi Taniuchi, Hiratsuka (JP);
Hirofumi Nakagawa, Hiratsuka (JP);
Koji Okamoto, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 401 days.

(21) Appl. No.: 12/298,313

(22) PCT Filed: May 29, 2007

(86) PCT No.: PCT/JP2007/060919
§ 371 (c)(1),
(2), (4) Date: Oct. 24, 2008

(87) PCT Pub. No.: WO2007/142082
PCT Pub. Date: Dec. 13, 2007

(65) Prior Publication Data
US 2010/0159471 A1    Jun. 24, 2010

(30) Foreign Application Priority Data
Jun. 5, 2006   (JP) ............................... P2006-156041

(51) Int. Cl.
B22F 9/24          (2006.01)
(52) U.S. Cl. .............................. 75/371; 516/97; 977/896
(58) Field of Classification Search .................. None
See application file for complete search history.

(56) References Cited

U.S. PATENT DOCUMENTS

2003/0116228 A1    6/2003   Pozarnsky ................... 148/251
2006/0207388 A1*   9/2006   Mirkin et al. .................. 75/371

FOREIGN PATENT DOCUMENTS

| JP | 63-274706 | 11/1988 |
| JP | 63-307208 | 12/1988 |
| JP | 7204493 | 8/1995 |
| JP | 8089788 | 4/1996 |
| JP | 10-317022 | 12/1998 |

OTHER PUBLICATIONS

Sau, T.K. et al., "Size Controlled Synthesis of Gold Nanoparticles Using Photochemically Prepared Seed Particles", Journal of Nanoparticle Research, vol. 3, pp. 257-261, 2001.*
Lofton, C. et al., "Mechanisms Controlling Crystal Habits of Gold and Silver Colloids", Advanced Functional Materials, vol. 15, pp. 1197-1208, 2005.*
Wagner, J. et al.: "Generation of Metal Nanoparticles in a Microchannel Reactor." Chemical Engineering Journal Elsevier Switzerland, vol. 101, No. 1-3, Aug. 1, 2004, pp. 251-260, XP002595440.
G. Frens, Nature Physical Science, 1973, vol. 241, p. 20-22.

* cited by examiner

*Primary Examiner* — George Wyszomierski
(74) *Attorney, Agent, or Firm* — Roberts & Roberts, LLP

(57) ABSTRACT

It is an object of the present invention to provide a method for producing gold colloid having a targeted particle size, a sharp particle size distribution and a uniform and perfect spherical shape. The present invention relates to a method for producing gold colloid including a nucleation step of forming nuclear colloidal particles by adding a first reducing agent to a first gold salt solution; and a growth step of growing nuclear colloid by adding a second gold salt and a second reducing agent to the solution of the nuclear colloidal particles, characterized in that the growth step is performed at least once; a citrate is used as the first reducing agent and an ascorbate is used as the second reducing agent; and the addition of the ascorbate in the growth step is performed simultaneously with addition of the second gold salt. According to the method for producing gold colloid of the present invention, gold colloid having a sharp particle size distribution and a uniform and perfect spherical shape can be obtained.

8 Claims, 1 Drawing Sheet

METHOD FOR PRODUCING GOLD COLLOID AND GOLD COLLOID

TECHNICAL FIELD

The present invention relates to a method for producing gold colloid and particularly to a method for producing gold colloid suitable for use in an in-vitro diagnostic agent and gold colloid.

BACKGROUND ART

In-vitro diagnostic agents use, for instance, blood, urine, saliva and tissue of patients to find types of diseases and causes thereof, while minimizing the effect upon a human body, and thus play an important role in early diagnosis and early treatment. The in-vitro diagnostic agents are applied to various diagnostic uses, and are helpfully used in pregnancy diagnosis and primary screening tests such as a screening test for colon cancer based on determination of fecal occult blood. As the in-vitro diagnostic agent as mentioned above, gold colloid having an antibody for detecting a target antigen for diagnosis bound on the surface thereof has been known.

To effectively use the in-vitro diagnostic agent, it is required to improve the sensitivity and thereby maintain reliability of diagnosis. To realize this, it is necessary to use gold colloid having a particle size suitable for various uses as mentioned above. For example, since extremely high sensitivity is required to the in-vitro diagnostic agent for pregnancy, gold colloid is desired to have a uniform particle size of 40 nm and a sharp particle size distribution.

When the antibodies for use in the in-vitro diagnostic agent are directly bound onto gold colloid, they are sometimes randomly coordinated. For this reason, a protein or an organic substance called a linker is sometimes bound in advance. To bind a desired number of linkers onto gold colloid at regular intervals, the gold colloid is required to have a uniform size and a virtually perfect spherical shape. When gold colloid has a uniform and perfect spherical shape, wine-red with high chroma saturation is exhibited. The gold colloid exhibiting such a color is most suitable for use in the in-vitro diagnostic agents. However, the color of gold colloid formed of particles having different aspect ratios exhibits violet-blue.

As described above, to increase the sensitivity of in-vitro diagnostic agents in accordance with various diagnostic purposes, gold colloid is desired to have a size suitable for use, a sharp particle size distribution and further a uniform and perfect spherical shape.

As a method for producing gold colloid, a method for reducing a gold salt solution is generally known. For example, Non-Patent Document 1 discloses a method for reducing gold chloride by sodium citrate trihydrate. Patent Documents 1 and 2 disclose methods of producing gold colloid by reducing a gold salt solution by a citrate or ascorbate.

Non-Patent Document 1: G. Frens, Nature Physical Science, 1973, Vol. 20, p. 241
Patent Document 1: Japanese Patent No. 2834400
Patent Document 2: Japanese Patent No. 2902954

DISCLOSURE OF THE INVENTION

However, as is described in Non-Patent Document 1, when a citrate alone was used as a reducing agent, gold colloid having a uniform particle size distribution could not be obtained and a spherical shape was not likely to obtain. On the other hand, when a citrate or an ascorbate alone was used as is described in Patent Document 1 and Patent Document 2, gold colloid having a sharp particle size distribution could not be obtained. Similarly, in some cases of the other methods for producing gold colloid known in the art, it was difficult to control a particle size. In other cases, a perfect spherical shape could not be obtained. In the circumstances, it is an object of the present invention to provide a method for producing gold colloid having a particle size suitable for a purpose, a sharp particle size distribution and a uniform and perfect spherical shape.

To attain the aforementioned object, the present inventors conducted intensive studies on a method for producing gold colloid by reducing a gold salt solution with a view toward obtaining, for example, a particle size suitable for use. As a result, they developed a method for producing gold colloid having a particle size, etc., suitable for a purpose by dividing a reduction process for a gold salt solution into multiple steps, for example, a step of forming nuclear colloid and a step of growing the nuclear colloid.

More specifically, the present invention relates to a method for producing gold colloid including a nucleation step of forming nuclear colloidal particles by adding a first reducing agent to a first gold salt solution; and a growth step of growing nuclear colloid particles by adding a second gold salt and a second reducing agent to the solution of the nuclear colloidal particles, characterized in that the growth step is performed at least once; a citrate is used as the first reducing agent and an ascorbate is used as the second reducing agent; and the addition of the ascorbate in the growth step is performed simultaneously with addition of the second gold salt.

The present invention is characterized in that a method for producing gold colloid having a targeted particle size is constituted of multiple steps including a step of forming nuclear colloid and a step of growing the nuclear colloid. Based on the constitution, the present invention is characterized in that the reducing agents to be used in the individual steps are specified to a citrate and an ascorbate, respectively, and further the addition of the reducing agent in the growth step is performed simultaneously with the addition of the second gold salt. These characteristics are designed to act synergically to produce gold colloid having a targeted particle size of 17 nm or more and a uniform and perfect spherical shape in the present invention.

A method for producing gold colloid according to the present invention is described below more specifically with respect to the nucleation step and the growth step.

As the first gold salt used in the nucleation step, gold chloride (III), gold chloride (I), gold trifluoride, gold monofluoride, gold monobromide, gold tribromide, gold (III) tricyanide, gold cyanide, gold fulminate(I), hydroxy gold (III) oxide, triiodo gold (III), tris gold nitrate (III), gold nitrate and the like may be mentioned. Besides these, hydrates and salts of these compounds or gold powder, gold foil and the like dissolved in aqua regia can be used.

Examples of the citrate as the first reducing agent for reducing the first metal salt may include lithium citrate, sodium citrate, potassium citrate, rubidium citrate, cesium citrate, calcium citrate, magnesium citrate, ammonium citrate, monoethyl citrate, diethyl citrate, triethyl citrate, monobutyl citrate, tributyl citrate, monoallyl citrate, diallyl citrate, triallyl citrate, sodium isocitrate, potassium isocitrate, calcium isocitrate, cesium isocitrate and ammonium isocitrate. In addition, citric acid, isocitric acid, hydroxycitric acid, percitric acid, citric acid anhydride, 2-methylcitric acid, citric acid anion 3-ammonium, citric acid anion-diammonium and alloisocitric acid can be used. These compounds may be used in the form of an aqueous solution.

A targeted particle size of nuclear colloid to be formed in the nucleation step is preferably 12 nm or more to less than 17 nm. This is because, when a citric acid based reducing agent is used, the resultant nuclear colloid can be formed in a uniform shape without any variation of the average particle size. However, when a particle size is less than 12 nm, a growth rate in the growth step tends to be unstable. When a particle size is 17 nm or more, a particle size of nuclear colloid is not sometimes uniformed.

Nuclear colloid having a targeted particle size within the above range can be formed by controlling an addition amount and method of a citrate serving as the first reducing agent. More specifically, it is preferred that the addition amount of the first reducing agent is set to fall within the range of 2 to 11 fold by mole based on the addition amount of the first gold salt. This is because nuclear colloid can be formed without any variation of the particle size. Furthermore, nuclear colloid having a uniform size can be formed by adding the whole amount of the reducing agent at a time unlike the case of adding it dropwise.

Next, the growth step of growing nuclear colloid is described. In the growth step, an ascorbate as the second reducing agent and the second gold salt are added simultaneously to grow nuclear colloid. As the second gold salt to be used in the growth step, any one of the gold salts available as the first gold salt in the nucleation step can be used; however, a gold chloride is preferably used as the first gold salt and/or the second gold salt. This is because gold chloride can be easily prepared into an aqueous solution of a desired concentration.

As the ascorbate as the second reducing agent, lithium ascorbate, sodium ascorbate, potassium ascorbate, rubidium ascorbate, cesium ascorbate, calcium ascorbate, magnesium ascorbate and the like can be used. Besides these, ascorbic acid, isoascorbic acid, scorbamic add, erythorbic acid, dehydroisoascorbic acid, deoxyascorbic acid, chloro-deoxyascorbic acid, iode-deoxyascorbic acid, bromo-deoxyascorbic acid, fluoro-deoxyascorbic acid, methyl-ascorbic acid, ethylascorbic acid and propylascorbic acid can be used. These compounds may be used in the form of an aqueous solution.

The second gold salt and ascorbate serving as the second reducing agent must be added simultaneously. This is because the growth rate of nuclear colloid becomes stable and gold colloid having a standard deviation of an average particle size within 10% or less can be obtained. Note that, as a preferable embodiment of the addition, the second reducing agent and the second gold salt may be added in the beginning of a single growth step at a time; however, desirably added simultaneously dropwise to grow gold colloid. This is because the growth rate of nuclear colloid becomes constant by the simultaneous addition and gold colloid having a uniform particle size can be produced.

The second gold salt and an ascorbate are preferably added in the amounts represented by the following formulas per growth step, respectively.

Second gold salt (g) $\{(N_2-N_1) \times C \times V/N_A\} \times Ma \times \alpha$ Second reducing agent (g) $\{(N_2-N_1) \times C \times V/N_A\} \times Mb \times \beta$      [Formula 1]

where $N_1$ is the total atomic number per gold colloidal particle having a particle size before growth;

$N_2$ is the total atomic number per gold colloidal particle having a particle size after growth;

C is the number of colloidal particles in a nuclear colloidal solution (1 L);

V is the total volume (L) of a nuclear colloidal solution;

$N_A$ is the Avogadro's number (defined as $6.02 \times 10^{23}$);

Ma is the molecular weight of the second gold salt;

Mb is the molecular weight of the second reducing agent; and $\alpha$ and $\beta$ are constants satisfying
$1.0 \leq \alpha \leq 2.5$, $2.0 \leq \beta \leq 5.7$ Then, the above formulas representing the addition amounts of the second gold salt and an ascorbate will be described. It is known that the radius of a gold atom is 1.44 angstroms (0.144 nm) and gold has a face-centered cubic lattice structure. Therefore, the particle size L of a single colloidal particle can be obtained from the atomic radius and the number of layers n in accordance with the following formula. Note that the number of layers n herein is defined as the number of layers provided that the group of atoms present at the same distance from a core atom of a single gold colloid is regarded as a layer.

[Formula 2]

$$\text{Particle size: } L = (2n+1) \times 0.288 \quad [1]$$

The number of layers n can be obtained from a targeted particle size L by modifying the above Formula [1] (Formula [2]). Furthermore, the outermost-layer atomic number y, which is a number of atoms constituting the outermost layer of a colloidal particle, can be obtained from the number of layers n (Formula [3]). Moreover, the total atomic number N of gold contained per gold colloidal particle can be obtained by seeking the outermost-layer atomic number y and the number of layers n by calculation and using Formula [4]

[Formula 3]

$$\text{Number of layers: } n = 1.74 \times (L - 0.3) \quad [2]$$

$$\text{Outermost layer atomic number: } y = 10 \times n^2 + 2 \quad [3]$$

$$\begin{aligned} \text{Total atomic number: } N &= \sum (10 \times n^2 + 2) \\ &= (10 \times 1^2 + 2) + \\ &\quad (10 \times 2^2 + 2) + \ldots + \\ &\quad (10 \times n^2 + 2) \end{aligned} \quad [4]$$

where

L represents a particle size (nm) of gold colloid;

n represents the number of layers of a gold atom;

y represents the atomic number of the outermost layer; and

N represents the total atomic number.

As is mentioned above, the total atomic number N of gold contained per colloidal particle can be calculated by determining a targeted particle size L to be obtained after the growth step. For reference, the total atomic number N of gold having a particle size of L was calculated in accordance with the above mathematical formulas. The calculation values are shown in Table 1 below.

TABLE 1

| Particle size L (nm) | The number of layers n | Outermost-layer atomic number Y (atoms) | Total atomic number N (atoms) |
|---|---|---|---|
| 15 | 26 | 6544 | 62062 |
| 17 | 29 | 8446 | 85608 |
| 20 | 34 | 11752 | 125356 |
| 30 | 52 | 26708 | 482404 |
| 40 | 69 | 47720 | 1119088 |

TABLE 1-continued

| Particle size L (nm) | The number of layers n | Outermost-layer atomic number Y (atoms) | Total atomic number N (atoms) |
|---|---|---|---|
| 50 | 86 | 74786 | 2157482 |
| 60 | 104 | 107908 | 3804008 |
| 70 | 121 | 147086 | 5978852 |
| 80 | 139 | 192318 | 9049178 |
| 90 | 156 | 243605 | 12776972 |
| 100 | 173 | 300948 | 17409336 |
| 110 | 191 | 364346 | 23409342 |
| 120 | 208 | 433799 | 30213456 |
| 130 | 226 | 509308 | 38733462 |
| 140 | 243 | 590871 | 48125826 |
| 150 | 260 | 678490 | 58925608 |
| 160 | 278 | 772164 | 72003892 |
| 170 | 295 | 871893 | 86010644 |
| 180 | 313 | 977677 | 102705008 |
| 190 | 330 | 1089517 | 120335150 |
| 200 | 347 | 1207412 | 139875472 |
| 210 | 365 | 1331362 | 162756466 |
| 220 | 382 | 1461367 | 186538858 |

In the present invention, the second gold salt and an ascorbate are added in the growth step. This is because the requisite amount of gold atoms for forming colloidal particles having a targeted particle size is supplied. More specifically, the addition amounts of them are equal to the deficit amount of gold atoms before and after the growth (to describe more accurately, the deficit amount of gold ions and the amount of a reducing agent for reducing the gold ions to gold atoms). This means the difference of the total atomic weight per gold colloidal particle before and after the growth. Accordingly, the addition amounts of the second gold salt and an ascorbate are obtained by calculating the total atomic weight per gold colloidal particle before and after the growth in accordance with the above mathematical formulas, and thus represented as follows:
[Formula 4]

$$\text{Second gold salt (g): } \{(N_2-N_1) \times C \times V/N_A\} \times Ma \quad [5]$$

$$\text{Second reducing agent (g) } \{(N_2-N_1) \times C \times V/N_A\} \times Mb \quad [6]$$

where $N_1$ is the total atomic number per gold colloidal particle having a particle size before growth;

$N_2$ is the total atomic number per gold colloidal particle having a particle size after growth;

C is the number of colloidal particles in a nuclear colloidal solution (1 L);

V is the total volume (L) of the nuclear colloidal solution;

$N_A$ is the Avogadro's number ($6.02 \times 10^{23}$);

Ma is the molecular weight of the second gold salt; and

Mb is the molecular weight of the second reducing agent.

In the above formula [5], the value of $(N_2-N_1)$ is the difference of the total atomic number per gold colloidal particle before and after the growth, in other words, the number of gold atoms required for growing a single colloidal particle. Therefore, if the number of gold atoms required for growing a single colloidal particle and the number C of colloidal particles contained in a nuclear colloidal solution (1 L) are used, the addition amount (g) of the second gold salt can be calculated in accordance with the above formula. Furthermore, the addition amount (g) of the second reducing agent is represented by the above formula [6] similarly to the case of the second gold salt. Note that the number C of colloidal particles can be obtained by multiplying the molar concentration (mol/L) of gold chloride contained in nuclear colloid by the Avogadro's number $N_A$ and then dividing the obtained value by the total atomic number of gold contained in the nuclear colloid.

In the present invention, it should be noted that the above formulas [5] and [6] only represent theoretical addition amounts of the second gold salt and an ascorbate. More specifically, the formulas are based on the premise that gold colloidal particles are ideally grown, for example, on the premise that the number (C) of gold colloidal particles contained in a nuclear colloidal solution does not change before and after the growth, and that the gold atoms produced by reduction are completely uniformly bound to a nuclear colloidal particle.

The present inventors have confirmed that when the gold colloidal particles are actually produced in multiple steps, the addition amounts of them required for growing the colloidal particles having a targeted size do not always follow the above formulas. This is because growth of gold colloidal particles does not always proceed in accordance with the aforementioned ideal process. In this circumstances, the present inventors conducted intensive studies to amend the above formula (Formula 4) such that the standard deviation of particle sizes after the growth falls within an acceptable range applicable to a method according to the present invention. As a result, the following formulas representing the amounts of the second gold salt and an ascorbate were obtained.

$$\text{Second gold salt (g) } \{(N_2-N_1) \times C \times V/N_A\} \times Ma \times \alpha$$

$$\text{Second reducing agent (g) } \{(N_2-N_1) \times C \times V/N_A\} \times Mb \times \beta \quad \text{[Formula 5]}$$

where $\alpha$ and $\beta$ are constants satisfying $1.0 \leq \alpha \leq 2.5$, $2.0 \leq \beta \leq 51$; and note that $N_1$, $N_2$, C, V, $N_A$, Ma and Mb are the same as defined in Formula 4.

In the above formula, $\alpha$ and $\beta$ are constants for amending a theoretical formulas. Based on these, colloidal particles having a targeted particle size can be formed. The symbol $\alpha$ is a constant for amending the addition amount of a gold salt and falls within the range 1.0 to 2.5, and more preferably, 1.1 to 2.2. On the other hand, the symbol $\beta$ is a constant for amending the addition amount of ascorbate and falls within the range of 2.0 to 5.7, and more preferably, 2.6 to 5.4. When a growth step is repeated a plurality of times, these constants may be changed every time. In particular, in the beginning of the repeat steps (first and second repeat steps), particle sizes are likely to vary and a relatively large amount of gold salt tend to be required. Therefore, $\alpha$ and $\beta$ are preferably set at larger values. Provided that the growth step is repeated three or four times, $\alpha$ is set at 1.4 to 1.6 and $\beta$ is set at 3.3 to 4.0 in the first and second repeat steps and $\alpha$ is set at 1.1 to 1.4 and $\beta$ is set at 2.6 to 3.2 in the repeat steps onward to facilitate formation of colloidal particles having a targeted particle size in each step.

In the present invention, in the cases where gold colloid having a larger particle size is produced, production is preferably performed by increasing the number of steps and using small addition amounts per step rather than the production performed in a less number of steps using large addition amounts per step. This is because gold colloid having a more uniform average size can be formed as a result that the number of growth steps is increased. More specifically, when the average particle size of gold colloid is set at 17 nm or more to less than 55 nm, the growth step is desirably performed once. When the size is set at 55 nm or more to less than 110 nm, the growth step is desirably performed twice. When the size is set at 110 nm or more to 220 nm or less, the growth step is preferably performed three times. Furthermore, when the growth step is performed multiple times, the particle size of gold colloid formed per repeat time of the growth step is measured to calculate the addition amounts of the second gold salt and the second reducing agent in the following step. In this manner, gold colloid having a more uniform particle size can be obtained.

With respect to the concentrations of a gold salt solution and an ascorbate solution to be used in each growth step are not particularly fixed to specific values as long as the amounts of solutes (weights of the gold salt and ascorbate) fall within the ranges of Formula 5. In other words, the amounts of solvents contained in the solutions are not particularly fixed. Furthermore, the concentrations of the gold salt solution and the ascorbate solution may be the same or different between growth steps. Moreover, the gold salt concentration in the growth step may be the same or different from that of the nucleation step. Since the concentrations of the solutions to be added in each step can be controlled as mentioned above, the concentration of a final colloidal solution can be controlled. This is an advantage of the present invention. Note that, in the nucleation step, which is virtually a starting point, it is preferred that the concentration of the first gold salt solution is set to fall within the range of $3.0 \times 10^{-4}$ mol/L to $1.3 \times 10^{-3}$ mol/L in terms of gold concentration. This is because when the gold concentration is set to be excessively high, the produced gold colloidal particles may coagulate.

In the present invention, the time interval between the nucleation step and the growth step or the time intervals between individual growth steps are not particularly limited. Accordingly, the process from the nucleation step to the end of the growth step can be performed continuously in the same system. Alternatively, the gold colloid is previously formed or grown to the middle stage. After a certain time interval, a gold salt and a reducing agent may be added to the gold colloid to grow gold colloid. For example, in the case where two growth steps are performed, a gold salt and a reducing agent are added to gold colloid, which is previously formed by applying a growth step once, to grow the gold colloid (in this way, another growth step is additionally performed). In this manner, gold colloid having a desired average particle size can be formed. Similarly, in the case where three growth steps are performed, gold colloid, which is previously formed by applying the growth step twice, can be used.

In the gold colloid obtained by the method for producing gold colloid according to the present invention, it is preferred that a standard deviation of a particle size obtained by observation of a TEM photograph falls within 10%. This is because such gold colloid is most suitable for use in an in-vitro diagnostic agent. Note that when gold colloid, even if it has a large particle size, is reduced by multiple steps, gold colloid having a sharp particle size distribution can be obtained. When gold colloid is used as an in-vitro diagnostic agent, the gold colloid having a size of 220 nm or less is suitable.

BEST MODE FOR CARRYING OUT THE INVENTION

Figure 1:
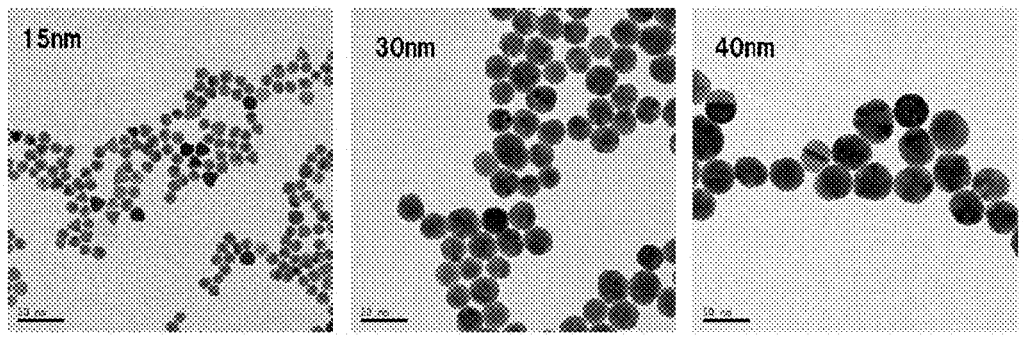
FIG. 1 shows TEM observation photographs of gold colloids obtained in Examples (nuclear colloid, Examples 1 and 2 from the left)

Best modes of the present invention will be described below.

EXAMPLE 1

In this example, gold chloride as the first gold salt was reduced by a citrate serving as the first reducing agent in the nucleation step to obtain nuclear colloid having a targeted size of 15 nm. Thereafter, in the growth step, gold chloride as the second gold salt and L-ascorbate as the second reducing agent were simultaneously added dropwise to form gold colloid having a targeted size of 30 nm.

[Nucleation Step]

Gold chloride tetrahydrate (0.17 g, $4.1 \times 10^{-4}$ mol) and trisodium citrate dihydrate (0.49 g, $1.6 \times 10^{-3}$ mol) were dissolved respectively in 25 ml and 100 ml of ultrapure water, to prepare a gold chloride solution and a citrate solution. Subsequently, a 500-ml three-neck flask was charged with the 6 ml of gold chloride solution and 200 ml of ultrapure water and refluxed with heating for 30 minutes. After the temperature of the solution became stable, 50 ml of citrate solution was added and refluxed with heating for 15 minutes. Thereafter, heating was terminated and the solution was allowed to cool at room temperature to form nuclear colloid. Note that ionized water and distilled water may be used in place of ultrapure water.

[Growth Step]

A 500-ml three-neck flask was charged with 52 ml of the nuclear colloid (average particle size: 15.22 nm, $3.0 \times 10^{-4}$ mol/L) formed by the above method and stirred in a constant-temperature vessel such that the liquid temperature reached 30° C. After the temperature of the solution became stable, gold chloride tetrahydrate (0.34 g, $8.2 \times 10^{-4}$ mol) was dissolved in 50 ml of ultrapure water. A 9.2 ml of aliquot was taken and diluted to 201 ml to obtain a gold chloride solution, which was simultaneously added dropwise with a 204 ml of L-ascorbate solution having sodium L-ascorbate (0.07 g, $3.5 \times 10^{-4}$ mol) dissolved in 204 ml of ultrapure water at a rate of 2.0 ml/min and allowed to react with stirring for one hour. In this manner, the growth step was performed once. The resultant gold colloidal solution exhibited wine red. Note that the addition amounts of gold chloride and sodium L-ascorbate were obtained in accordance with Formula 1 by setting a targeted particle size at 30 nm, constant α was set at 1.4, and constant β was set at 3.3.

EXAMPLE 2

In this example, gold colloid having a targeted particle size of 40 nm was produced. Nuclear colloid (26 ml, average particle size: 15.22 nm, $3.0 \times 10^{-4}$ mol/L) formed in the nucleation step of Example 1 was used as nuclear colloid, and a 252 ml of gold chloride solution having gold chloride tetrahydrate (0.076 g, $1.8 \times 10^{-4}$ mol) dissolved therein and 256 ml of L-ascorbate solution having sodium L-ascorbate (0.092 g, $4.6 \times 10^{-4}$ mol) dissolved therein were used. The conditions other than the above were the same as those in the method employed in the growth step of Example 1. Note that the addition amounts of gold chloride and sodium L-ascorbate were calculated by setting constant α at 1.4 and constant β at 3.5.

EXAMPLE 3

In this example, gold colloid having a targeted particle size of 50 nm was produced. Gold colloid (12 ml, average particle size: 15.22 nm, $3.0 \times 10^{-4}$ mol/L) obtained in Example 1 was used, and a 233 ml of gold chloride solution having gold chloride tetrahydrate (0.072 g, $1.7 \times 10^{-4}$ mol) dissolved therein and a 233 ml of L-ascorbate solution having sodium L-ascorbate (0.094 g, $4.7 \times 10^{-4}$ mol) dissolved therein were used. The conditions other than the above were the same as those in the method employed in the growth step of Example 1. The gold colloid of Example 2 used herein was obtained by growing nuclear colloid in a single growth step. Therefore, in Example 3, the growth step came to be performed twice in total. Note that the constants α and β used in calculating the addition amounts of gold chloride and sodium L-ascorbate were set at 1.4 and 3.8, respectively.

EXAMPLE 4

In this example, gold colloid having a targeted particle size of 60 nm was produced. Gold colloid (66.7 ml, average particle size: 39.07 nm, $3.0 \times 10^{-4}$ mol/L) obtained in Example 2 was used and a 80 ml of gold chloride solution having gold chloride tetrahydrate (0.027 g, $6.5 \times 10^{-5}$ mol) dissolved therein and a 81.3 ml of L-ascorbate solution having sodium L-ascorbate (0.029 g, $1.5 \times 10^{-4}$ mol) dissolved therein were used. The conditions other than the above were the same as those in the method of Example 3. Note that the constants α and β used in calculating the addition amounts of gold chloride and sodium L-ascorbate were set at 1.2 and 2.7, respectively.

EXAMPLE 5

In this example, gold colloid having a targeted particle size of 80 nm was produced. Gold colloid (33.3 ml, average particle size: 39.07 nm, $3.0 \times 10^{-4}$ mol/L) obtained in Example 2 was used and a 118 ml of gold chloride solution having gold chloride tetrahydrate (0.039 g, $9.4 \times 10^{-5}$ mol) dissolved therein and a 120 ml of L-ascorbate solution having sodium L-ascorbate (0.043 g, $2.2 \times 10^{-4}$ mol) dissolved therein were used. The conditions other than the above were the same as those in the method of Example 3. Note that the constants α and β used in calculating the addition amounts of gold chloride and sodium L-ascorbate were set at 1.2 and 2.8, respectively.

EXAMPLE 6

In this example, gold colloid having a targeted particle size of 100 nm was produced. Gold colloid (33.4 ml, average particle size: 39.07 nm, $3.0 \times 10^{-4}$ mol/L) obtained in Example 2 was used and a 247 ml of gold chloride solution having gold chloride tetrahydrate (0.079 g, $1.9 \times 10^{-4}$ mol) dissolved therein and a 251 ml of L-ascorbate solution having sodium L-ascorbate (0.092 g, $4.6 \times 10^{-4}$ mol) dissolved therein were used. The conditions other than the above were the same as those in the method of Example 3. The color of the resultant gold colloidal solution exhibited wine red. Note that the constants α and β used in calculating the addition amounts of gold chloride and sodium L-ascorbate were set at 1.2 and 2.9, respectively.

EXAMPLE 7

In this example, gold colloid having a targeted particle size of 200 nm was produced. The same method as in the growth step of Example 1 was carried out except that 17 ml of 4-fold concentrate of the gold colloid (average particle size: 99.68 nm, $3.0 \times 10^{-4}$ mol/L) obtained in Example 6 was used and a 62 ml of gold chloride solution having gold chloride tetrahydrate (0.078 g, $1.9 \times 10^{-4}$ mol) dissolved therein and a 61.6 ml of L-ascorbate solution having sodium L-ascorbate (0.090 g, $4.5 \times 10^{-4}$ mol) dissolved therein were used. The gold colloid of Example 6 was obtained by performing the growth step twice. Therefore, in this Example, the growth step came to be performed three times in total. The resultant gold colloidal solution exhibited wine red. Note that the constants α and β used in calculating the addition amounts of gold chloride and sodium L-ascorbate were set at 1.3 and 3.1, respectively.

Average particle sizes and standard deviations of the gold colloid of each of the above Examples were measured/calculated through observation of TEM photographs by the method described below.

The average particle size and standard deviation (%) were obtained by using a photograph taken by TEM (JEM-2010 manufactured by JEOL Ltd.).

Figure 2:
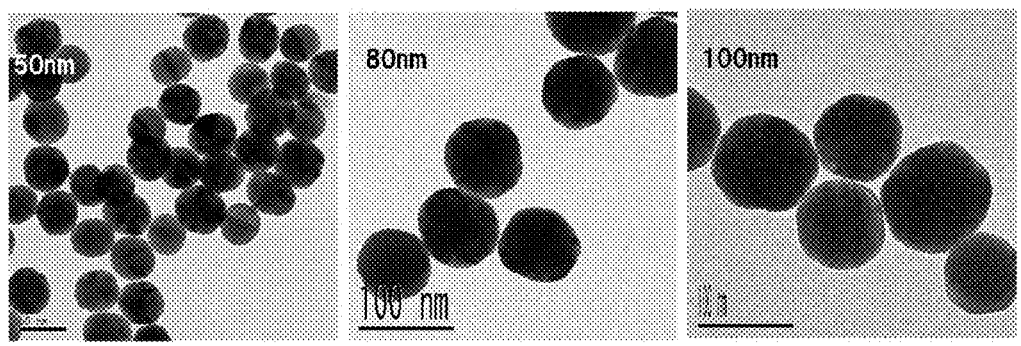
FIG. 2 shows TEM observation photographs of gold colloids obtained in Examples (Examples 3, 5 and 6 from the left)

More specifically, the sizes of 100 sample-particles in the photograph were measured to obtain a particle size distribution, based on which the average particle size and standard deviation (%) were obtained. The results are shown in Table 2. TEM observation photographs of Examples are shown in FIGS. 1 and 2.

TABLE 2

| | Average particle size before growth (nm) | Targeted average particle size (nm) | Average particle size (nm) | Standard deviation (%) |
|---|---|---|---|---|
| Nuclear colloid | — | 15 | 15.22 | 9.12 |
| Example 1 | 15.22 | 30 | 30.53 | 9.90 |
| Example 2 | 15.22 | 40 | 39.07 | 9.62 |
| Example 3 | 15.22 | 50 | 48.37 | 4.67 |
| Example 4 | 39.07 | 60 | 59.03 | 7.58 |
| Example 5 | 39.07 | 80 | 76.69 | 7.91 |
| Example 6 | 39.07 | 100 | 99.68 | 8.77 |
| Example 7 | 99.68 | 200 | 207.14 | 5.75 |

From Table 2, it was demonstrated that the gold colloids according to Examples 1 to 7, which were formed by a nucleation step of forming nuclear colloid by using a citrate as a first reducing agent and a growth step using an ascorbate as a second reducing agent, have average particle sizes substantially in coincide with desired average particle sizes, and that the standard deviations of all Examples fall within 10% or less. Similarly, the standard deviations of the nuclear colloids also fell within 10% or less. From FIGS. 1 and 2, it was observed that gold colloid obtained in each of the Examples has a virtually perfect spherical shape.

COMPARATIVE EXAMPLE 1

Gold colloid having a targeted particle size of 40 nm was produced by using an ascorbate alone as a reducing agent without performing stepwise reduction. A 252 ml of gold chloride solution having gold chloride tetrahydrate (0.079 g, $1.9 \times 10^{-4}$ mol) dissolved therein and a 256 ml of L-ascorbate solution having sodium L-ascorbate (0.092 g, $4.6 \times 10^{-4}$ mol) dissolved therein were simultaneously added dropwise to 26 ml of ultrapure water to form the gold colloid. Note that the conditions other than the above were the same as those of the method employed in the growth step of Example 1.

COMPARATIVE EXAMPLE 2

Gold colloid having a targeted particle size of 40 nm was produced by using a citrate as the first and second reducing agents. In the nucleation step, a gold chloride solution and a citrate solution were prepared by dissolving gold chloride tetrahydrate (0.0134 g, $3.2\times10^{-5}$ mol) and trisodium citrate dihydrate (1.14 g, $3.9\times10^{-3}$ mol) respectively in 110 ml and 100 ml of ultrapure water. Subsequently, a 500-ml three-neck flask was charged with the gold chloride solution and refluxed with heating. After the temperature of the solution became stable, 1 ml of citrate solution was blended and refluxed with heating for 2 minutes. Thereafter, heating was terminated and the solution was allowed to cool at room temperature to form nuclear colloid.

The nuclear colloid ($3.0\times10^{-4}$ mol/L, 26 ml) formed by the above method was used and a 252 ml of gold chloride solution having gold chloride tetrahydrate (0.079 g, $1.9\times10^{-4}$ mol) dissolved therein and a 256 ml of citrate solution having trisodium citrate (0.1386 g, $4.6\times10^{-4}$ mol) dissolved therein were used. Note that the conditions other than the above were the same as those of the method employed in the growth step of Example 1.

COMPARATIVE EXAMPLE 3

A case where gold colloid having a targeted particle size of 50 nm was produced by adding the second gold salt and thereafter adding the second reducing agent in the growth step will be described. A gold chloride ($1.0\times10^{-2}$ mol/L, 2.44 ml) was blended with the nuclear colloid ($2.5\times10^{-4}$ mol/L, 2.25 ml) obtained in the nucleation step of Example 1. To the mixture, ultrapure water was added to obtain a solution mixture of 150 ml, which was stirred at room temperature. Thereafter, sodium L-ascorbate (100 ml, $4.0\times10^{-4}$ mol/L) was added dropwise at a rate of 10 ml/min and then sufficiently stirred to form gold colloid.

TABLE 3

|  | Average particle size (nm) | Standard deviation (%) |
|---|---|---|
| Comparative Example 1 | 167.8 | 11.84 |
| Comparative Example 2 | 17.27 | 14.6 |
| Comparative Example 3 | 49 | 20.4 |

From the results mentioned above, in Comparative Example 1, in which stepwise reduction was not performed and an ascorbate alone was used as a reducing agent, it was found that the obtained gold colloid has an excessively large average particle size and a slightly large standard deviation, compared to a targeted particle size of 40 nm. In Comparative Example 2, in which reduction was performed by a citrate both in the nucleation step and the growth step, it was found that the obtained gold colloid has a smaller average particle size than a targeted particle size of 40 nm and has a large standard deviation. Furthermore, in Comparative Example 3, in which the second gold salt and the second reducing agent were not added simultaneously in the growth step, it was found that gold colloid having a particle size close to a targeted particle size of 50 nm is obtained; however, the standard deviation becomes very large.

Figure 3:
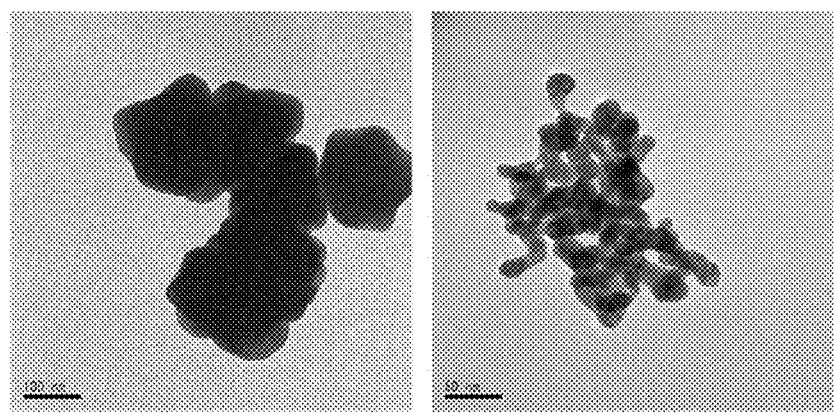
FIG. 3 shows TEM observation photographs of gold colloids obtained in Comparative Examples (Comparative Examples 1 and 2 from the left).

From the TEM observation photographs in FIG. 3, it was found that the shape of the gold colloid of Comparative Example 1 is not uniform compared to Examples and colloid becomes rough and large. Furthermore, in Comparative Example 2, it was shown that colloid is coagulated and fails to form a perfect spherical shape.

INDUSTRIAL APPLICABILITY

As is described in the above, according to the method for producing gold colloid of the present invention, gold colloid having a sharp particle size distribution and uniform and perfect spherical shape can be obtained. In particular, the present invention makes it possible to obtain gold colloid having a particle size of 17 nm or more, in accordance with the purpose of use within a standard deviation of 10%. The present invention is suitable for producing gold colloid for use in in-vitro diagnostic agents. In addition, also in the diagnosis called as a histochemistry marker, which is in-vitro diagnosis observing stained cells, gold colloid having the same feature as that of the in-vitro diagnostic agent is desired. The present invention is also suitable for use in this application.

The invention claimed is:

1. A method for producing gold colloid comprising:
   a nucleation step of forming nuclear colloidal particles having a particle size of 12 nm to 17 nm, by adding a first reducing agent to a first gold salt solution; and
   a growth step of growing nuclear colloidal particles by adding a second gold salt and a second reducing agent to the solution of the nuclear colloidal particles, wherein the growth step is performed at least once; a citrate is used as the first reducing agent and an ascorbate is used as the second reducing agent;
   in a single growth step, the second gold salt and the ascorbate are added in amounts represented by the following formulas, respectively:

Second gold salt (g) $\{(N_2-N_1)\times C\times V/N_A\}\times Ma\times\alpha$

Second reducing agent (g) $\{(N_2-N_1)\times C\times V/N_A\}\times Mb\times\beta$     [Formula ]1 where
   $N_1$ is the total atomic number per gold colloidal particle having a particle size before growth;
   $N_2$ is the total atomic number per gold colloidal particle having a particle size after growth;
   C is the number of colloidal particles in a nuclear colloidal solution (1L);
   V is the total volume (L) of a nuclear colloidal solution;
   $N_A$ is the Avogadro's number (defined as $6.02\times10^{23}$);
   Ma is the molecular weight of the second gold salt;
   Mb is the molecular weight of the second reducing agent; and
   $\alpha$ and $\beta$ are constants satisfying
   $1.0\leq\alpha\leq2.5$, $2.0\leq\beta\leq5.7$
   and in said growth step, the ascorbate and the second gold salt are added simultaneously dropwise.

2. The method for producing gold colloid according to claim 1, wherein the first gold salt and/or the second gold salt is gold chloride.

3. The method for producing gold colloid according to claim 2 wherein the growth step is performed once and an average particle size of the colloidal particles is 17 nm or more to less than 55 nm.

4. The method for producing gold colloid according claim 2 wherein the growth step is performed twice and an average particle size of the colloidal particles is 55 nm or more to less than 110 nm.

5. The method for producing gold colloid according to claim 2 wherein the growth step is performed three times and an average particle size of the colloidal particles is 110 nm or more to 220 nm or less.

6. The method for producing gold colloid according to claim 1 wherein the growth step is performed once and an average particle size of the colloidal particles is 17 nm or more to less than 55 nm.

7. The method for producing gold colloid according claim 1 wherein the growth step is performed twice and an average particle size of the colloidal particles is 55 nm or more to less than 110 nm.

8. The method for producing gold colloid according to claim 1 wherein the growth step is performed three times and an average particle size of the colloidal particles is 110 nm or more to 220 nm or less.

* * * * *